(12) United States Patent
Yoshizawa et al.

(10) Patent No.: US 7,019,791 B2
(45) Date of Patent: Mar. 28, 2006

(54) VIDEO PROCESSING DEVICE

(75) Inventors: Kazuhiko Yoshizawa, Yokohama (JP);
Nobuaki Kabuto, Kunitachi (JP);
Atsushi Yoshioka, Ebina (JP)

(73) Assignee: Hitachi, Ltd., Tokyo (JP)

( * ) Notice: Subject to any disclaimer, the term of this patent is extended or adjusted under 35 U.S.C. 154(b) by 478 days.

(21) Appl. No.: 10/109,041

(22) Filed: Mar. 29, 2002

(65) Prior Publication Data

US 2003/0090590 A1    May 15, 2003

(30) Foreign Application Priority Data

Nov. 9, 2001   (JP) .............................. 2001-344013
Dec. 26, 2001  (JP) .............................. 2001-393106

(51) Int. Cl.
*H04N 5/60*   (2006.01)

(52) U.S. Cl. ................................. 348/738

(58) Field of Classification Search ........ 348/563–569, 348/555, 553, 706, 558, 725; 725/70
See application file for complete search history.

(56) References Cited

U.S. PATENT DOCUMENTS

| | | | |
|---|---|---|---|
| 5,446,505 A * | 8/1995 | Chang Soo et al. ........ | 348/738 |
| 5,774,195 A * | 6/1998 | Miyahara et al. .......... | 348/726 |
| 5,875,279 A * | 2/1999 | Owashi et al. ............. | 386/46 |
| 5,953,066 A * | 9/1999 | Yun ............................ | 348/485 |
| 6,072,541 A * | 6/2000 | Song ......................... | 348/706 |
| 6,147,713 A * | 11/2000 | Robbins et al. ............ | 348/555 |
| 6,268,887 B1 * | 7/2001 | Watanabe et al. .......... | 348/554 |
| 6,275,267 B1 * | 8/2001 | Kobayashi .................. | 348/555 |
| 6,476,878 B1 * | 11/2002 | Lafay et al. ................ | 348/738 |
| 6,580,452 B1 * | 6/2003 | Gangitano .................. | 348/180 |
| 6,587,154 B1 * | 7/2003 | Anderson et al. .......... | 348/553 |
| 6,738,528 B1 * | 5/2004 | Nio et al. ................... | 382/268 |
| 2002/0066104 A1 * | 5/2002 | Shibusawa .................. | 725/70 |

FOREIGN PATENT DOCUMENTS

| | | |
|---|---|---|
| JP | 61-290529 | 12/1986 |
| JP | 02-019082 | 1/1990 |
| JP | 3-166877 | 7/1991 |
| JP | 5-207401 | 8/1993 |
| JP | 6-189273 | 7/1994 |
| JP | 6-217231 | 8/1994 |
| JP | 7-240887 | 9/1995 |
| JP | 2001-8129 | 1/2001 |
| JP | 2001-285802 | 10/2001 |

OTHER PUBLICATIONS

*Digital Interface Standards For Monitor*, Version 1.0, JEIDA-59-1999, Feb. 1999, pp. 1-82.

* cited by examiner

*Primary Examiner*—Paulos M. Natnael
(74) *Attorney, Agent, or Firm*—McDermott Will & Emery LLP (57) ABSTRACT

A video processing device includes a control circuit for detecting a physical quantity related to a size of noise contained in the input video signal, and an OSD (On Screen Display) circuit for providing a user with a warning screen when the physical quantity detected by the control circuit is larger than a prescribed value, obtaining an appropriate video signal even when a digital video signal has poor quality.

15 Claims, 7 Drawing Sheets

EXAMPLE OF WARNING MESSAGE BY OSD

CAUTION!
NOISE TENDS TO BE CAUSED DUE TO
DEFECTIVE CONNECTION OF AV CABLE.
SELECT ONE FROM THE FOLLOWING.

1. CHANGE TO SHORT AND QUALITY CABLE.
2. NOTHING COPES WITH IT.
3. LOWER RESOLUTION TO STABILIZE.

VIDEO PROCESSING DEVICE

BACKGROUND OF THE INVENTION

The present invention relates to a video processing device capable of adapting digital video and audio signals in television broadcasting, movie software and other package media.

The digitalization of the video and the audio signal is advancing in these days. Accordingly, a broadcast receiving device (hereafter called as STB; set-top-box) which receives television signals, a digital recording player, an HD (High Definition) television receiver and other display devices have become possible to correspond to the digital video signals and the audio signals.

As is well known, information signals such as video signals and audio signals undergo various types of processing such as compression of data amount, time division multiplex and others. Such signals are decoded by the STB to return them to the original form. Therefore, at least image information is generally given to a display device at a base band when it is digitally passed to the display device.

Television broadcasting signals, and other reproduction signals of hard disc recorders and DVDs (Digital Versatile Discs) and digital VTRs are input to the display device through the STB. Therefore, it is necessary to establish a standard passing such information signals to the STB.

In the North America region, a standard EIA/CEA861 was issued in January 2000 as a digital video baseband transmission standard on display devices.

The standard described above employs DVI 1.0 (Digital Visual Interface version 1.0) as a connection standard on the main body of PC (Personal Computer) and the display device. In the case of the method of connecting the PC body and the display device, there have been JP-A-61-290529 and Digital Interface Standards for Monitor Version 1.0 (JEIDA-59-1999), pp 1–82, established by Japan Electronic Industry Development Association, or the like, which mainly specifies a transmission method of image information in detail. In this case, audio information is sent through a separate connection line. The audio information may be either in an analog or digital form, and the separate connection line may be any of an analog cable, a digital coaxial cable, a digital optical cable or the like.

SUMMARY OF THE INVENTION

However, for ease of use, it is desirable to transmit both video and audio by means to a pair of cables. As a method for that, there have been proposed various methods such as a method of superimposing a digital audio signal during a vertical or horizontal blanking interval of the video signal.

The digital video information tends to have an increased error rate because of a high transmission rate, a long cable being connected, or the like. In the environment where an error occurs easily when a transmission is made for a long distance for broadcasting, recording on or reproducing from a recording medium is made, or the like, the error is generally corrected. But, when a transmission distance is short, for example, between the STB and the display device, an error in audio information is inevitably corrected, but an error in video information is not corrected because of a cost problem. In practice, it is possible that the occurrence of an error becomes a problem depending on a use environment, and some means are demanded in place of the error correction. None of the above publications describes about such means.

In view of the problems described above, it is an object of the invention to provide an video processing device which can obtain an appropriate video signal (a less error rate) even when input digital video information has a high error rate.

In order to achieve the above object, the video processing device according to the invention is provided with a circuit for detecting an error rate of the input digital video signal from the signal generating device such as the STB or the digital audio signal which is superimposed on it and alarm display unit which shows a remedying method to a user when the error rate becomes worse. Furthermore, it is configured to have a holding circuit which holds plural pieces of signal format information including at least one of the number of scanning lines and horizontal resolution of a digital video signal and a control circuit which selects at least one of a plurality of signal formats held by the holding circuit, and at least one of the plurality of signal formats held by the holding circuit is selected and transmitted to the signal generating device.

Specifically, it is configured that when the error rate is higher than a prescribed threshold value, a signal format having a less number of scanning lines and/or horizontal resolution than the digital video signal being received now is selected.

According to the above configuration, a warning screen, which indicates that there is a high rate of errors and video signals with low quality are being input and indicates possible countermeasures, may be shown on the screen of a television receiver, for example. The warning screen may show a message urging the replacement of the connection line for transmitting the digital video signal, or may include alternatives which make the user to decide whether the selection to be described later is performed (selection of a signal format having low scanning lines and/or horizontal resolution) or not. If an error rate is high (many noises), the user gives an instruction or an instruction is automatically given to a signal generating device to output a digital video signal having less scanning lines and/or lower horizontal resolution, so that an appropriate video signal with a small error rate can be obtained.

When both of a digital video and audio signal and an analog video and audio signal are receivable, the analog video and audio signal may be selected if the digital audio signal has a high error rate. Besides, when the digital video signal is not being received, the analog signal may be selected, and when the analog signal is not being received, the digital video signal may be selected. Furthermore, when the reception circuit for receiving the digital video signal is receiving a signal indicating a still image (for example, image of solid black, solid white, etc.) having a single color or single brightness, an analog video signal may be selected. An energy-saving effect can be expected by lowering or suspending the supply of power to a non-selected circuit block.

Thus, when both of the digital video and audio signal and the analog video and audio signal can be receivable but the digital video signal cannot be received properly because of some troubles, it can be switched to the analog video signal to properly receive the video signal.

Other objects, features and advantages of the invention will become apparent from the following description of the embodiments of the invention taken in conjunction with the accompanying drawings.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE EMBODIMENTS

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications a fall within the ambit of the appended claims.

Embodiments of the invention will be described with reference to the accompanying drawings. In this invention, an error rate of the input digital video signal and/or digital audio signal (hereinafter might be collectively called as digital information, and the analog type might be called as analog information) is detected, and if it is high, switching is made by the part of a signal source so to transmit in a format which is not largely influenced by the error. The format which is not largely influenced means, for example, a format having a low data rate such as horizontal resolution and scanning lines. When analog information is given together with digital information, the following procedure is taken. Specifically, when the digital information has a high error rate, analog information is selected to make signal processing. Otherwise, they are compared for quality to select a better one, and signal processing is performed. When digital video information is not input, analog video information is selected, and signal processing is performed. If necessary, details relating to such operation and switching may be shown on a display section to attract the attention of the user.

Figure 1:
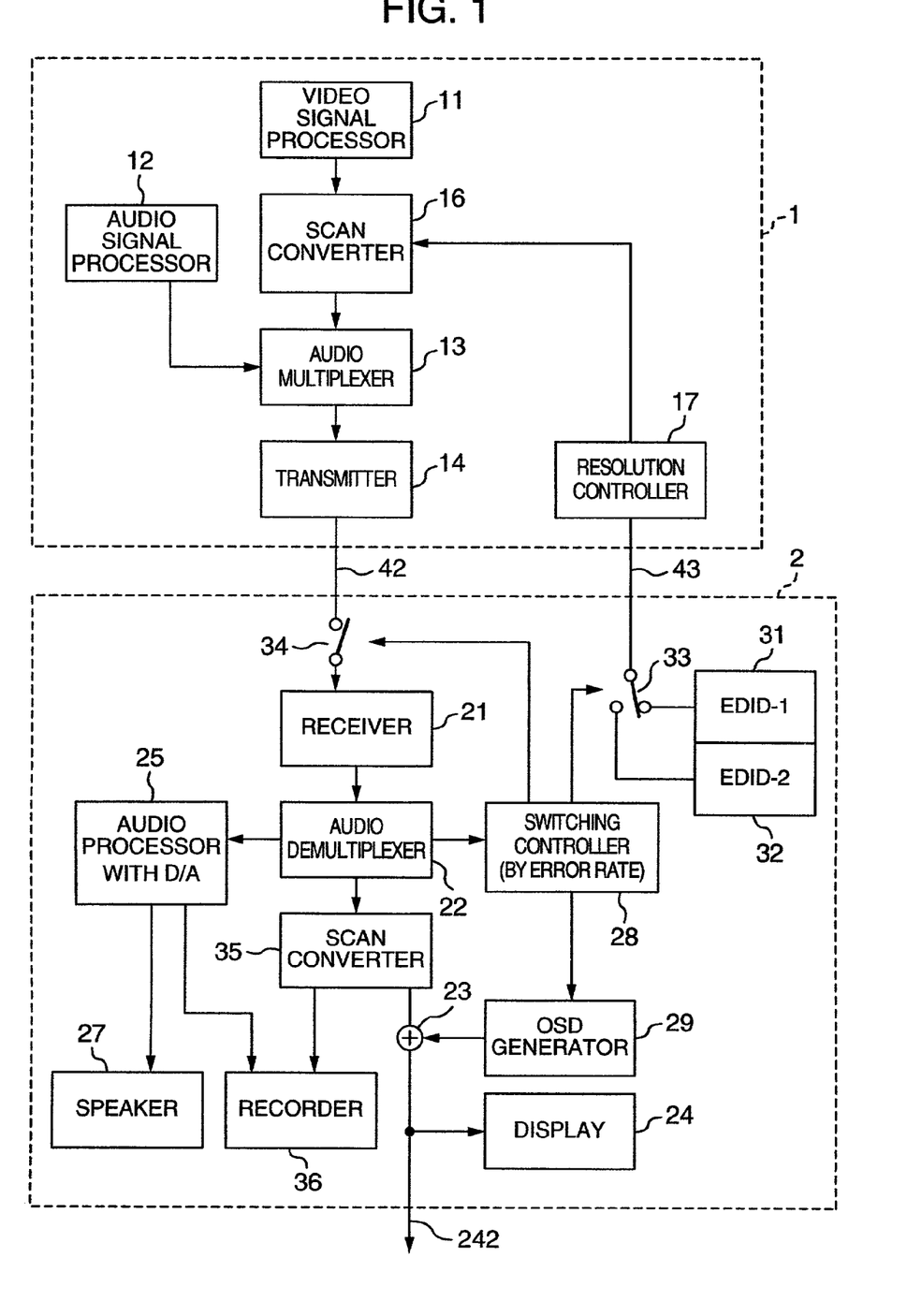
FIG. 1 is a circuit block diagram showing a first embodiment of the invention.

An operation for the above processing will be described with reference to FIG. 1 with special emphasis on the items mentioned above. FIG. 1 is a block diagram showing a first embodiment of the invention and it is provided with a signal generating device 1 such as an STB and a video processing device 2. Here, the video processing device 2 will be described referring to a display device such as a television receiver. They are mutually connected through two interfaces (cables or the like) 42, 43. In this embodiment, the signal generating device 1 and the video processing device 2 are connected through the two interfaces, but they may be connected though a single interface when such communications functions can be made by a single interface.

First, details of the signal generating device 1 will be described. A digital video signal is generated from a video signal source 11 of the signal generating device 1, and a digital audio signal is generated from an audio signal processor 12. When the signal generating device 1 is an STB, it is information obtained by receiving digital broadcasting for example, or information reproduced from a hard disc recorder which is built in the STB. When the signal generating device 1 is a DVD, a digital VTR or the like, it is information reproduced from an inserted or built-in recording medium and may be package software for example.

Output of the video signal processor 11 is given to a scan converter 16. The scan converter 16 is controlled by a resolution controller 17, and a format of the video signal is converted accordingly if required as described later. Output of the scan converter 16 is given to an audio multiplexer 13. Here, the digital audio signal from the audio signal processor 12 is superimposed on the digital video signal. It may be made by some types of methods. For example, there is a method of superimposing during the horizontal or vertical blanking interval of video. Because it is not necessary to send the video signal during the blanking interval, the digital audio signal may be sent with an audio signal determined as an audio packet instead of the video signal during the blanking interval. Output of the audio multiplexer circuit 13 is given to a data transmitter 14, code-converted if necessary, and power-amplified, and then given to the display device 2 through the interface 42.

Then, an operation of the video processing device 2 will be described. The digital video signal input through the interface 42 is given to a data receiver 21 via a switch 34 when it is closed. If code conversion has been made for transmission, the signal is decoded here. The output signal of the data receiver 21 is given to an audio demultiplexer 22, where the digital audio signal is separated from the digital video signal and supplied to an audio processor 25 which has a DAC (digital-analog converter) therein. It is also input to a switching controller 28 if necessary. The audio demultiplexer 22 and the switching controller 28 may not be separated but integral into one. It also falls in the category of the invention.

An operation of the audio demultiplexer 22 is naturally variable depending on a digital audio signal multiplexing method. For example, when the audio signal is superimposed on the video's horizontal or vertical blanking interval, the separating operation is performed according to timing of blanking. The audio processor 25 having the DAC performs various types of signal processing such as time-base conversion, error correction, data expansion or the like, of the digital audio information separated by the audio demultiplexer 22 if necessary, and the processed signal is returned to the analog signal by the built-in DAC. This analog audio signal is supplied to a speaker 27 to reproduce the voice. When a recorder 36 is included in the video processing device 2, the audio signal is recorded on a recording medium by the recorder 36.

Meanwhile, the digital video signal separated by the audio demultiplexer 22 is given to a scan converter 35, which converts a format of the video signal as required as described later, and given to an addition circuit 23. In the addition circuit 23, information from an OSD (On Screen Display) generator 29 is added, and the video signal is input to a display 24 to show the image. When there is a video output 242, the video is also output externally. Furthermore, when the recorder 36 is provided, the output from the scan converter 35 is recorded on the recording medium by the recorder 36.

The digital video or audio signal separated by the audio demultiplexer 22 is also supplied to the switching controller 28. The switching controller 28 detects an error rate of the digital video signal (or digital audio signal) to control the switching of a switch 33 depending on the level of the error rate and also sends an instruction for showing a warning indication to an OSD generator 29. The switch 33 is connected to a holding circuit which holds a plurality of signal formats of the digital video signal. The holding circuit includes a first EDID (Extended Display Identification Data; data indicating a compatible signal format) circuit 31 and a second EDID circuit 32, and they are comprised of a nonvolatile memory such as EEPROM, for example. Specifically, the first and second EDID circuits 31, 32 function as memory for storing the above signal format. One of the input terminals of the switch 33 is connected to the first EDID 31 and the other is connected to the second EDID circuit 32. Therefore, the switching controller 28 selects either the first EDID 31 which holds a first signal format or the second EDID circuit 32 which holds a second signal format via the switch 33 depending on a magnitude of the error rate of the digital video signal. When either of the EDID circuits is selected by the switch 33, the signal format held by the selected EDID circuit is sent to the signal generating device 1 through the interface 43. The signal generating device 1 generates a digital video signal which agrees with the signal format sent through the interface 34 and supplies it to the video processing device 2.

Figure 2:
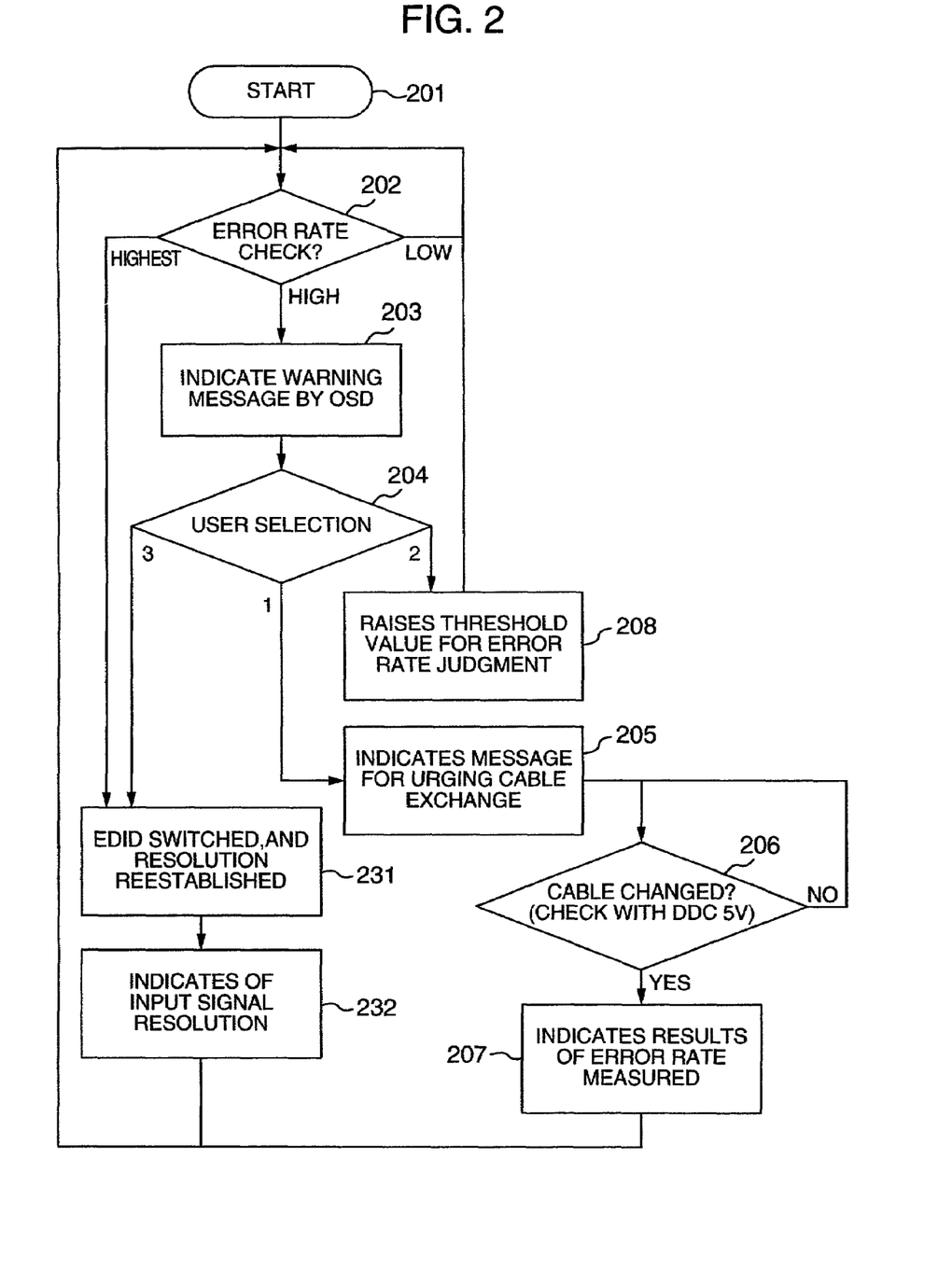
FIG. 2 is a flow chart illustrating an operation of a switching control circuit of FIG. 1.

Details of the operation of the switching controller 28 will be described with reference to the flow chart shown in FIG. 2. A start 201 in FIG. 2 indicates a starting point of a series of operations. In an error rate check judging step 202, an error rate of the input digital video signal is detected and its magnitude is judged. Here, the error rate is judged from the digital video signal but it is not essential. In the transmission for a relatively short distance, a correction of an error may be performed on audio information only, so that the error rate may be judged using an error correction function on the digital audio signal superimposed on the digital video signal. The error rate is not judged on the video signal itself, but it might be also possible to judge the error rate from control information (e.g., copy control information indicating whether recording of information on the recording medium is allowed or not) added to the video signal. The copy control information is sent at the frequency of, for example, every two seconds in order to check that the connected device is a device operating according to the copy control information. An error rate of the copy control information may be judged at the same time.

In the error rate check judging step 202, the detected error rate is compared with a prescribed first threshold value. When the detected error rate is judged to be smaller than the threshold value in this step, the procedure returns to the start, and the judgment of the error rate is repeated while receiving input of information. When the detected error rate exceeds a second threshold value which is larger than the first threshold value, it is judged that noise is largely mingled and not suitable for seeing and listening. In this case, the procedure proceeds to step 231. In step 231, reestablishment of the format of the digital video signal such as horizontal resolution and scanning lines is instructed to the signal generating device 1, and the procedure proceeds to step 232. In step 232, characters and the like are shown on the screen so that the user can understand that the format of the digital video signal from the signal generating device 1 was recreated (changed). Then, the procedure returns to the start to repeat the judgment of the error rate.

When re-establishment of the signal format is instructed in step 231 and the switch 33 is connected to the first EDID circuit 31, which holds the signal format of high horizontal resolution/scanning lines, as shown in FIG. 1, the switch 33 is switched to the second EDID circuit 32 which holds a low signal format. If the switch 33 has been connected to the second EDID circuit 32, the same state is held. If there are third and fourth formats, switching to such formats may be made stepwise. The signal format sent to the signal generating device 1 through the interface 43 is given to the scan converter 16 through the resolution controller 17. Here, format conversion processing is performed to generate a digital video signal with lower scanning lines and horizontal resolution (than the former video signal judged as having a high error rate) indicated by the transmitted signal format.

As described above, when there are extremely many errors, the switching controller 28 selects a signal format in which a data rate is low (resolution is low) and an error rate tends to be low even under the same transmission conditions. Thus, an appropriate video with less noise and high quality is obtained even if the resolution is low.

When the format of an input digital video signal is to be changed, it is also necessary to re-establish the resolution such as scanning lines by the display device 2. Therefore, output of the switching controller 28 is also given to the switch 34. The switch 34 is turned off for a prescribed period to stop the supply of the input signal and the re-establishment is performed during that period. Disposition of the switch on the route for the main digital information as shown in FIG. 1 may result in a loss. To avoid such a loss, re-establishment may be performed with a potential of a hot plug terminal changed instead of omitting the switch 34.

Output of the switching controller 28 in FIG. 1 is also given to the OSD generator 29. When the format is changed, the OSD generator 29 generates character information indicating the change and makes the addition circuit 23 to add it to video information to be shown. When the format is changed and the resolution is lowered, it is possible that users may have complaints. To deal with it, the scan converter 35 of FIG. 1 may up-convert the number of scanning lines to show in a state prior to lowering of the resolution in appearance.

Figure 3:
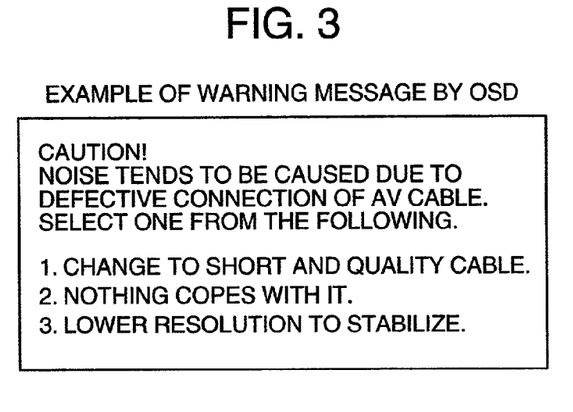
FIG. 3 is a diagram showing an example display by an OSD circuit of FIG. 1.

Returning to FIG. 2, the switching controller 28 will be described furthermore. In the aforementioned step 202, measures are not necessarily required, but when it is judged that the error rate is high to such a level that measures are recommended, namely the error rate is larger than the first threshold value but smaller than the second threshold value, then the procedure proceeds to step 203. In step 203, a warning message is shown by the OSD to call the user's attention. Then, the switching controller 28 gives an instruction to the OSD generator 29 to show the warning image on the display 24. In response to the instruction, the OSD generator 29 supplies a video signal for forming, for example, the warning image shown in FIG. 3 to the adder 23. The warning image shown in FIG. 3 shows the user that a cable for transmitting the digital video signal is defective or not appropriate for the observation of a good image and includes alternatives asking whether the cable is changed to another cable and a format selection may be performed to lower the image resolution by the switching controller 28. For example, three alternatives are provided as shown in FIG. 3, and the user selects a desired one among them. When the desired one is selected by the user, the procedure proceeds to step 204. In step 204, it is judged which of the alternatives 1 to 3 is selected.

When the user selects 1 to change the cable to a short and quality cable, the procedure proceeds to step 205, and the OSD generator 29 shows, for example, a message, "Change the cable" to urge the cable exchange. Proceeding to step 206, it is judged whether the cable was actually exchanged or not by monitoring a potential of the interface 42 by, for example, the switching controller 28. The above procedure is continued until the cable is actually exchanged, and when the cable is exchanged, the error rate is determined again and the improved state is OSD-displayed in step 207, and the error rate is continuously judged again.

When the user selects 2 not to take measures but to see as it is, the procedure proceeds to step 208, and the first threshold value for judging the error rate is lowered. Thus, the sensitivity for judgment of the error rate for its levels is lowered so not to show the warning image as "low error rate" even when an error rate of a certain level has occurred. The procedure returns to the start, and the judgment of the error rate is repeated again.

When the user selects 3 to attempt to stabilize by lowering the resolution, the procedure proceeds to step 231 to control for switching the format such as scanning lines and horizontal resolution as described above. For its details, the description about the processing when the error rate exceeds the second threshold value is applied.

It may also be set in such a way that when the user does not respond even after a lapse of prescribed time, it is automatically determined that either the alternative 2 or 3 is selected, and the operation is performed. Furthermore, the OSD display may be continued for a long time according to the content, and it may also be configured that the indication of the warning image in steps 207, 232 of FIG. 2 is continued for a prescribed period only. The judgment of the error rate does not complete by simply judging once at the start, so that it is possible to take measures if the situation changes on the way.

In the judgment of the error rate in step 202, it is preferable that the aforementioned switching operation is not performed immediately when the detected error rate exceeds the first and second threshold values, but switching is performed in consideration of the duration in the state exceeding the threshold. If there is a moment when the error rate was deteriorated once in a long time, it is rather annoying to change in every case. Therefore, it is desirable to change for the first time when the state that the detected error rate exceeds the threshold value continues for about several seconds for example.

By configuring as described above, measures can be taken according to an error rate of the input information. If necessary, the format such as the number of scanning lines and horizontal resolution of the input video information can be changed to improve the error rate. According to the selection made by the user, its measures may be selected, and the user can know the operating state of the device on the warning screen. Furthermore, when the format switching control is performed for the first time when the state with a high error rate continues for a prescribed time, annoyance involved in frequent switching because of an error increase at the moment can be remedied.

FIG. 1 shows that the EDID circuits 31, 32 are disposed on the side of the display device, selected by the switch 33 to send to the signal generating device 1, but the invention is not limited to it. In addition, there are a method to generate a control command to change a signal format when the error rate exceeds the threshold value and to send to the signal generating device 1 and a method to send data on the measured error rate to judge measures by the signal generating device 1, and they are within the category of the invention.

Figure 4:
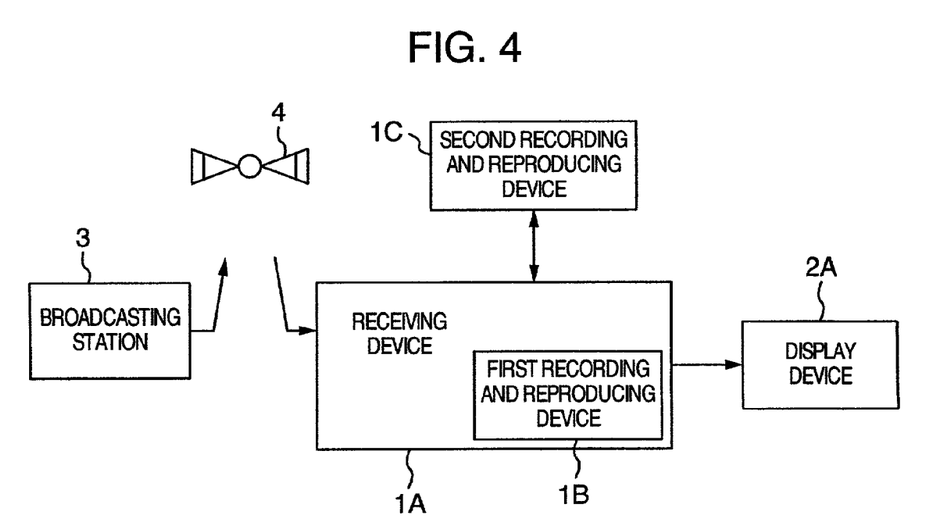
FIG. 4 is a block diagram showing an example of the digital information sending and receiving record system to which the present invention is applied.

Here, an example of the overall system to which the invention is applied will be described. FIG. 4 is a block diagram showing an embodiment of the overall system used in this invention to show an example that information is sent and received by broadcasting and recorded and reproduced. It includes a device to which the invention is applied. A first recording and reproducing device 1B of FIG. 4 is built in a broadcasting receiving device 1A, and a hard disc recorder is often used. A second recording and reproducing device 1C is externally fitted to the broadcasting receiving device 1A, and a DVD, a digital VTR or the like is often used. The present invention can be applied even if either or both of the recording and reproducing devices 1B, 1C are not disposed.

An information providing station 3 such as a broadcasting station sends signal radio waves modulated by information via a relay station 4 such as a broadcasting satellite for example. Transmission by cable, transmission by telephone wire, transmission by terrestrial broadcasting or the like may be used. For example, signal radio waves received by the broadcasting receiving device 1A on the receiving side such as STB for example is demodulated to be come an information signal, and if necessary, it becomes a signal suitable for recording in the first recording and reproducing device 1B and the second recording and reproducing device 1C and it is recorded. The demodulated information signal is also sent to a display device 2A. Information which is reproduced by the first recording and reproducing device 1B or the second recording and reproducing device 1C is given to the display device 2A through the broadcasting receiving device 1A. When a removable recording medium on which information is recorded in advance, e.g., package software, is provided, the reproduction operation and following are performed by, for example, the second recording and reproducing device 1C having such a recording medium. To perform the aforementioned transmission, a data amount of the signal is often compressed, but it is expanded to the original state just before the provision of the signal to the display device 2A. In the case of recording in the recording and reproducing devices 1B, 1C, it is common to record in a compressed state. Therefore, to reproduce information from them, the signal is expanded once through the broadcast receiving device 1A and given to the display device 2A. The signal of a portion which gives a signal from the broadcasting receiving device 1A to the display device 2A is released from the compressed state and the data amount is enormous, so that it is hard to record.

The video input processing device 2 shown in FIG. 1 corresponds to the display device 2A of FIG. 4. The signal generating device 1 of FIG. 1 corresponds to the broadcasting receiving device 1A alone of FIG. 4 or a combination of the broadcasting receiving device 1A and the second recording and reproducing device 1C. To see and hear what is being broadcast now by means of the display device 2A, the broadcasting receiving device 1A excluding the first recording and reproducing device 1B corresponds to the signal generating device 1. To show what is reproduced from the first recording and reproducing device 1B, the entire broadcasting receiving device 1A including it corresponds to the signal generating device 1. To show what is reproduced from the second recording and reproducing device 1C, the combination of the signal and the receiving device 1A corresponds to the signal generating device 1. A PC (Personal Computer) having a tuner board and a graphic board is also considered as an example of the signal generating device 1. In this case, the first recording and reproducing device 1B corresponds to a built-in hard disc drive and its periphery, and the display device 2A corresponds to a display for the PC.

Then, a second embodiment of the invention will be described with reference to the block diagram of FIG. 5. Here, an interface of video information between the signal generating device 1 and the display device 2 is performed by two systems of digital and analog, and a preferable one (in terms of image quality) is selected for displaying.

Figure 5:
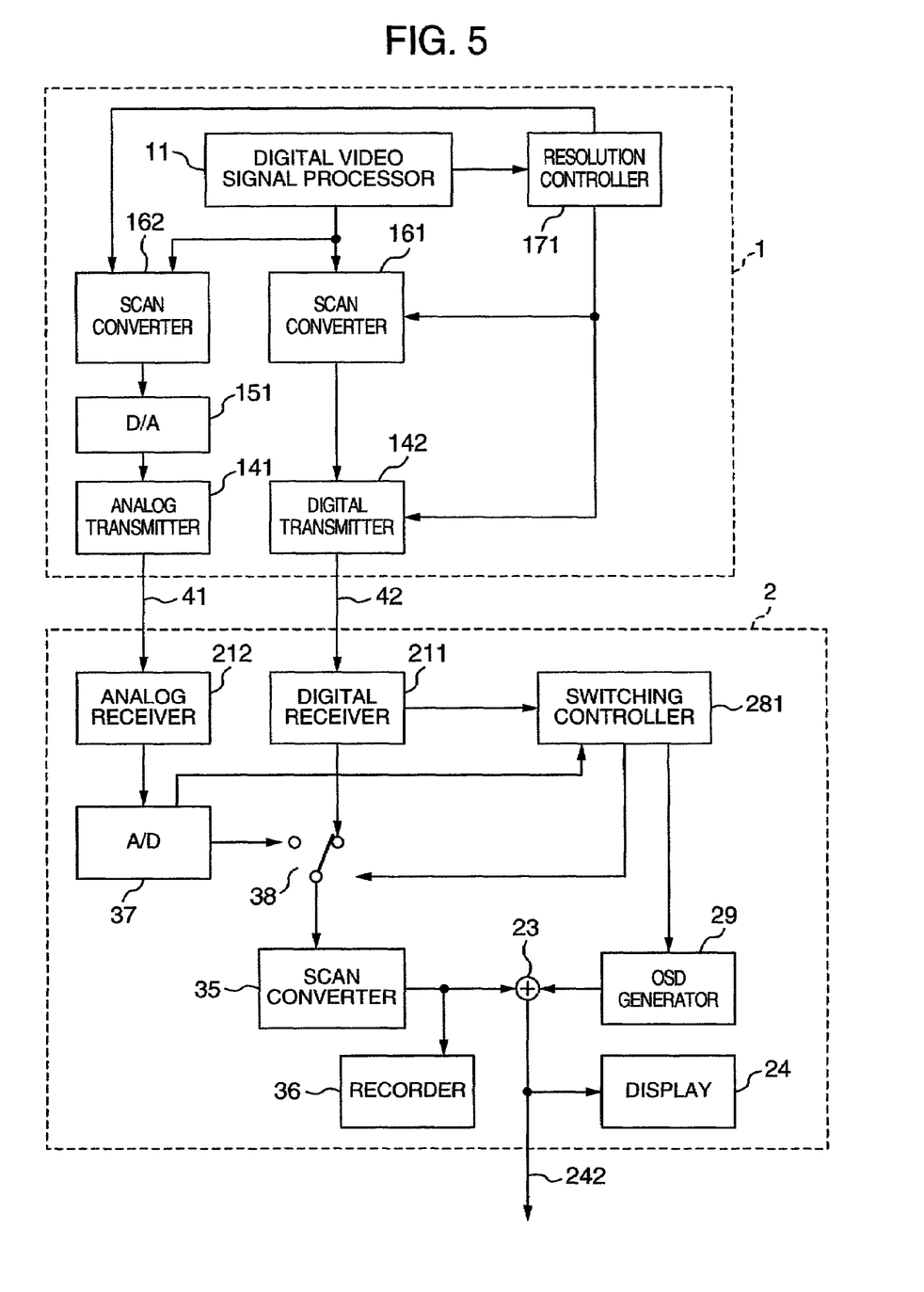
FIG. 5 is a circuit block diagram showing a second embodiment of the invention.

In FIG. 5, like reference numerals are used to indicate like components as those shown in FIG. 1. Components related to the transmission of an audio signal are omitted. In the signal generating device 1, the video signal generated by the digital video signal source 11 is divided into two systems. One of the divided signals is supplied to the video processing device 2 which is a display device in a digital form via a first scan converter 161, a digital transmitter 142 and then the interface 42. The other is supplied to the video processing device 2 through an interface 41 as an analog form video signal after passing through a second scan converter 162 and a DAC 151.

A resolution control circuit 171 controls operations of the scan converters 161, 162 on the basis of attribute information on the image from the digital video signal processor 11. If the information is highly classified, for example, the one which is output in analog, or both of them which are output in digital and analog, are limited the number of scanning lines, horizontal resolution and the like. In the environment that the one which is passed in digital has a high error rate, the operation to similarly limit the one to be output in digital is considered. The scan converters 161, 162 can be the same one depending on the setting of operations.

In the display device 2, output of a digital receiver 211 is supplied to a switching controller 281 and one of the input terminals of a switch 38. Output of an analog receiver 212 is converted into a digital signal by an ADC (analog-digital converter) 37 and supplied to the switching controller 281 and the other input terminal of the switch 38. The switching controller 281 monitors states of digital information and analog information and controls the switch 38 to select a desirable one between them. Information selected by the switch 38 is undergone up-converting processing by a scan converter 35 if necessary, and recorded on a recording medium if there is the recorder 36. The information is also given to the addition circuit 23 and superimposed with information such as characters generated by the OSD generator 29 according to an instruction of the switching controller 281, and shown on the display 24. If there is the audio output 242, the video signal is further output to outside.

In the switching controller 281, it is decided which input is shown between the digital information and the analog information as follows. An error rate of the signal input to the digital receiver 211 is detected, and when the detected value is smaller than a prescribed threshold value, the digital side is selected, and when the detected value is larger than the prescribed threshold value, the analog side is selected because the digital video signal is judged to be poor in quality. The error rate may be an error rate of the digital audio information superimposed on the image in the same way as in the aforementioned case. There is also a method of comparing a physical quantity which is directly related to the image quality such as noise without employing an error rate to make judgment, and outputting the one having better image quality. If either of them is not input, the one having the signal actually input is selected regardless of the quality. Thus, favorable input is automatically selected without troubling the user.

If neither of them is input or if the error rate is extremely high even if digital input is made, an instruction may be issued to the OSD generator 29 to output a warning message. In this way, the display may be configured to show which input is selected on the OSD.

In any cases, the judgment may be made when the operation is started and continuously made to cope with a change in circumstances. It may be configured that if the situation changes, switching is not made immediately but made after the continuation of the same situation for several seconds or more, so that inconvenience of instantaneous switching frequently made because of deterioration of quality can be remedied.

There is also a method of switching to analog information when digital information is not supplied. For example, when the resolution controller 171 of the signal generating device 1 instructs the scan converter 161 to change the resolution, the resolution controller 171 sends an instruction to the digital transmitter 142 to stop the digital output when the resolution is being changed. Thus, the switching controller 281 of the display device 2 detects that the digital information is not being supplied, and controls the switch 38 to switch to the direction opposite from the one shown in the drawing so to make processing of the information on the analog input side. At this time, the OSD generator 29 may show that the input is switched to the analog side. Conversely, if no analog information is supplied, it may be configured that the switch 38 selects digital information.

When the supply of the digital information is stopped by the signal generating device 1, for example, an image of a single color or single brightness with solid black or solid white, a telop indicating a supply stop, a still image indicated by the OSD or the like may be sent through the interface on the digital side only. Therefore, there is a third method of switching the switch 38 to the analog side by detecting that digital information has become a still image of single color or single brightness by the switching controller 281. If there is a possibility that malfunction occurs when even an ordinary image has less movement, it may be configured to continue processing at the input of the digital side without switching when information is the same between the input on the digital side and the input on the analog side. The above solid black or solid white image can be output even when the digital video signal is protected from unauthorized copying, so that the configuration of this embodiment is applied to such a case.

By configuring as described above, one of the input digital video signal and the separately input analog video signal, with better quality, can be selected and output automatically. If either input signal is missing, the other signal is automatically selected, but if its quality has a defect, a warning can be provided, indicating which one was selected. There is an effect that inconvenience of frequent switching due to an increase of errors in a short time can be remedied.

Then, the third embodiment of the invention will be described with reference to the block diagram of FIG. 6. Here, when two systems of digital audio and analog audio are being sent, one with desirable sound quality is selected and reproduced.

Figure 6:
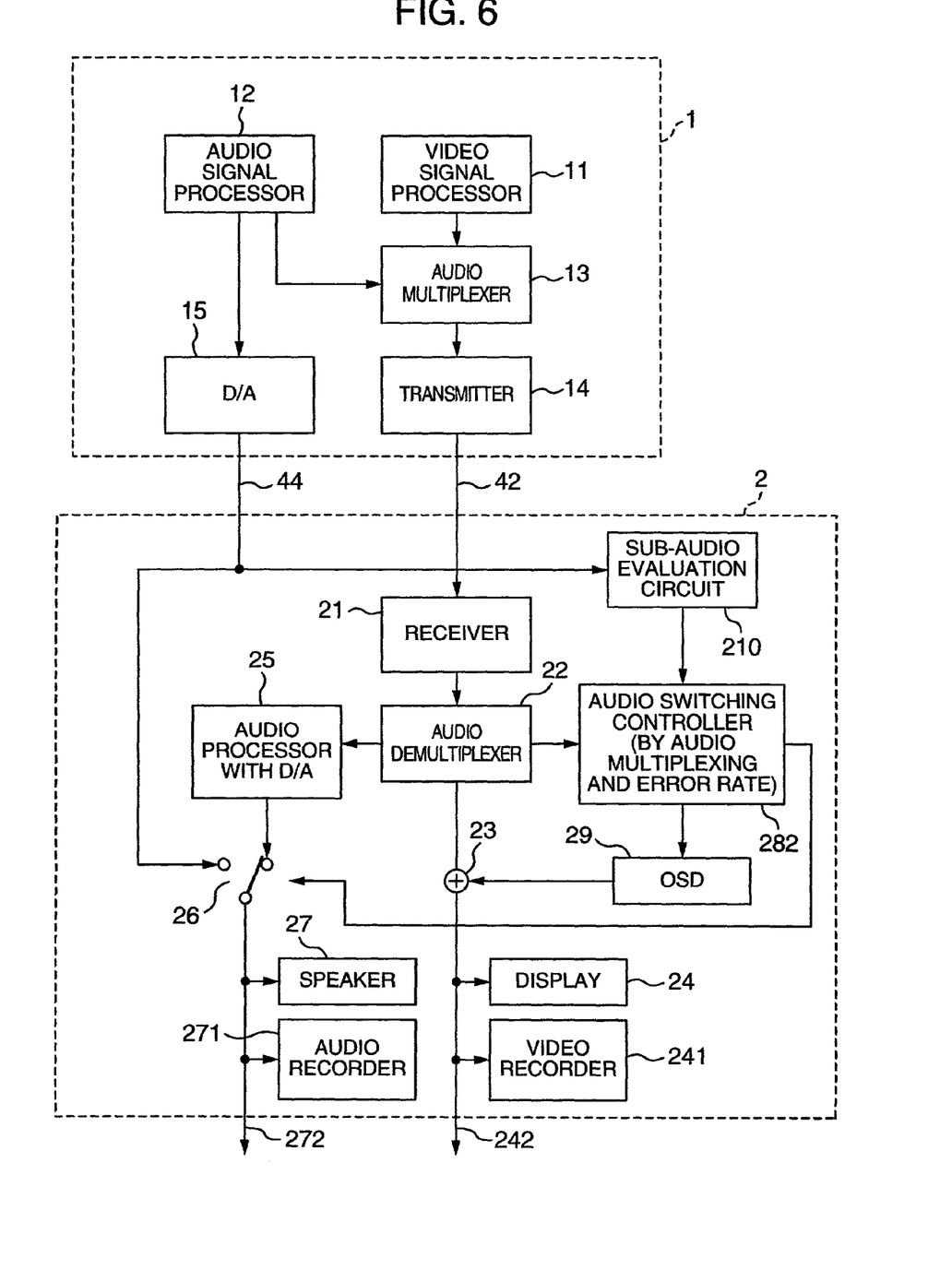
FIG. 6 is a circuit block diagram showing an embodiment of the invention.

In FIG. 6, like reference numerals are used for like components as those shown in FIG. 1. In the signal generating device 1, the digital audio signal generated by the digital audio signal processor 12 is divided into two systems, and one of them is passed through the audio multiplexer 13, where the digital sound is superimposed on the digital video signal, and the digital transmitter 14 so to be supplied to the video processing device 2, which is a display device, through the interface 42. The other is passed through the DAC so to be changed to an analog audio signal and supplied to the video processing device 2 through the interface 44.

In the display device 2, an audio switching controller 282 decides which of the analog audio or the digital audio is selected. The selection is decided from an evaluation result by a sub-audio evaluation circuit 210, which evaluates quality of the analog audio signal, the presence or not of audio superimposition and an error rate of digital video or audio signal and switches a switch 26.

In this embodiment, it is automatically judged whether the digital audio signal is superimposed on the video signal so that the user is not required to make a troublesome switching operation. Generally, the signal sent in a digital form has better quality than the signal sent in an analog form, so that when the signal is superimposed, the digital audio signal superimposed on the video signal is selected and output with priority. According to the judged result, the power supply of the audio signal processing circuit on the non-use side may be turned off for power saving. But, judgment whether the digital signal is superimposed or not is continuously performed.

Furthermore, even the digital audio signal is suddenly degraded in quality when its error rate becomes high, and it becomes preferable to output the one connected in an analog form. Therefore, either of them may be selected and output according to not only the presence or not of the superimposition of the digital audio signal but also the error rate when the digital audio signal has been superimposed. The signal generating device 1 and the display device 2 are based on the premise that they keep a relatively short distance between them, so that when transmission is made in a digital form, it is usual not to correct an error of video information, but for audio information of which specification on an error is strictly specified, errors are often corrected, so that it is easy to realize the function of monitoring the error rate.

In the future, the device may be increasingly designed based on the premise that the digital audio signal is superimposed on the video signal. To preserve compatibility with the existing devices, it is considered that the connection of the audio signal in an analog form will be preserved, and the present invention can be applied.

When the audio signal to be output is switched or there are extremely many errors even if the digital audio signal has been superimposed and a defect is presumable, a message indicating it is issued, and when there are plural measures, it is convenient to make the user to be able to select it.

Details of the operation of FIG. 6 will be described with emphasis on the above matters. The digital video signal is generated from the video signal processor 11 which is a component of the signal generating device 1 and the digital audio signal is generated from the audio signal processor 12. When the signal generating device 1 is an STB, it is information obtained by receiving, for example, digital broadcasting, and information reproduced from the hard disc recorder built in the STB. For a DVD, a digital VTR or the like, it is information reproduced from the fitted recording medium, and it may be package software for example.

The digital audio signal is superimposed on the digital video signal by the audio multiplexer 13. Some methods are devised for that. For example, there is a method of superimposing on a horizontal or vertical blanking interval of an image. Because it is not necessary to transmit the video signal during the blanking interval, the digital audio signal may be sent with an audio signal determined as an audio packet instead of the video signal during the blanking interval.

Output of the audio multiplexer 13 is given to the data transmitter 14, subjected to code conversion if necessary, subjected to power amplification, and given to the display device 2 through the interface 42. Output of the former audio signal processor 12 is also given to the DAC 15 to become an analog audio signal, and given to the video and sound receiving device 2 through an interface 44.

Then, an operation of the video and sound receiving device 2 will be described with reference to FIG. 7 as required. The digital video signal input through the interface 42 is given to the data receiver 21. If the digital video signal has been undergone the code conversion for the transmission, it is decoded here. The digital video signal is given to the audio demultiplexer 22, where the digital audio signal is separated and input to the audio processor with D/A 25 with the DAC and the audio switching controller 282. When the audio signal is not superimposed, dummy data is given to the audio processor 25 with the DAC, and information on non-superimposition of audio is given to the audio switching controller 282. The audio demultiplexer 22 and the audio switching controller 282 may not be independent circuits but an integral circuit, and it is also within the category of the invention. Meanwhile, the digital video information is given to the adding circuit 23, where information from the OSD generator 29 to be described later is added thereto, and input to the display 24 to show the image. When a video recorder 241 is disposed, the image is recorded in it, and when the video output 242 is disposed, the image is output. The operation of the audio demultiplexer 22 is different depending on the digital audio signal multiplexing method. For example, when the audio signal is superimposed on the horizontal or vertical blanking of the image, it is separated depending on the timing of blanking.

An operation of the audio switching controller 282 will be described. FIG. 7 is a flow chart showing an operation of the audio switching controller 282 and will also be used for reference. In FIG. 7, start 101 indicates the staring point of a series of operation. First, the presence or not of the superimposition of the digital audio signal on the video signal is judged in step 102 of judging the superimposition of audio. There have been known several methods, e.g., it is judged from format information contained in received data, it is judged according to whether a clock of the audio signal is reproduced or not from information separated by the audio demultiplexer 22, or the like. If the digital audio signal is not superimposed, the procedure proceeds downward in FIG. 7 to step 103, where an instruction is issued to the switch 26 to switch it to connect to the direction opposite from the one shown in the drawing. As a result, the input audio signal is supplied to the speaker 27 without superimposing on the video signal which is input through the interface 44, to reproduce sound. When an audio recorder 271 is disposed, sound is recorded in it, and when an audio output 272 is disposed, audio is output there.

Figure 7:
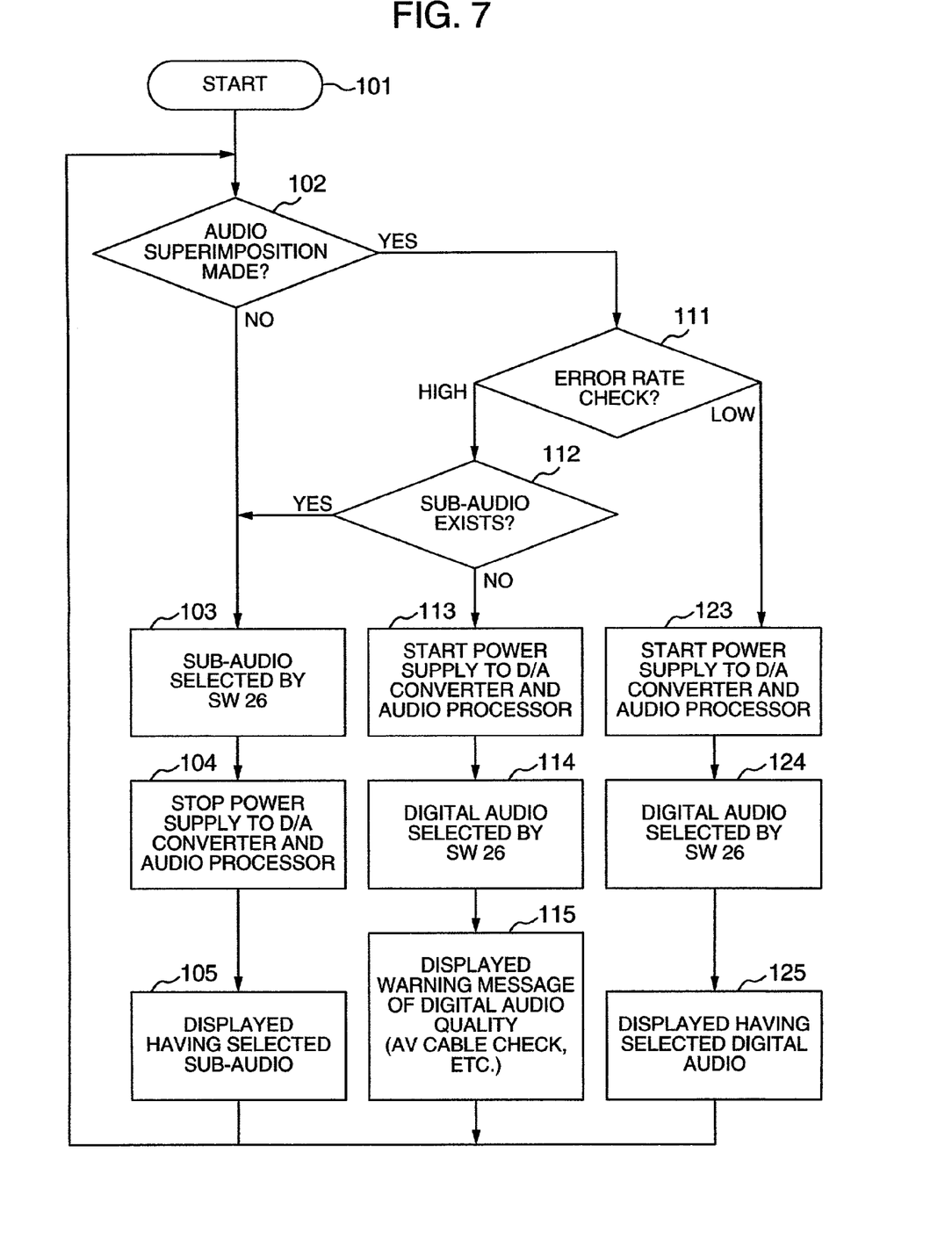
FIG. 7 is an operational flow chart illustrating an operation of an audio switching control circuit of FIG. 6.

At this time, power consumption may be reduced to stop supplying power to a non-use circuit block, such as the audio processor 25 with the DAC, as indicated by 104 in FIG. 7. Furthermore, an instruction may be sent to the OSD generator 29 to show a message on the display 24 to indicate the output of the audio signal supplied from the interface 41 as indicated by 105 in FIG. 7. The display may be continued for a long time or may be erased after showing for a short time only. Not only displaying simply but also measures such as cable exchange or switching to the analog audio may be selected. Then, after returning to the step 102 of judging the superimposition of audio, judgment is continued. To enable to take measures even if the situation changes on the way, the judging operation does not terminate after conducting once at the start.

In FIG. 1, the audio signal input through the interface 44 is described as an analog signal but the invention is not limited to it. In other words, it means that the audio signal is sent through another interface without superimposing on the video signal, the interface is a digital coaxial cable, a digital optical cable, infrared rays, radio or the like, and a case of supplying as the digital audio signal is also included in the invention. In such a case, the DAC 15 of the signal generating device 1 is removed, the DAC is disposed between the interface 44 and the switch 26, or the DAC of the audio processor 25 with the DAC is separated and disposed between the switch 26 and the speaker 27.

Case of judgement on the superimposition of the digital audio signal by the audio switching controller 282 will be described. In FIG. 7, the procedure shifts from step 102 to step 111 to judge an error rate. Here, the error rate of the digital audio signal which is superimposed on the video signal and input is judged. Naturally, when there are a lot of errors, the digital audio signal may have inferior quality as compared with the audio signal input in an analog form. When the error rate is low and quality of a prescribed level or higher can be expected, the procedure goes downward from the right side of step 111 of FIG. 7 to step 123, where power is supplied to the audio processor 25 with the DAC, and when the separated audio signal has been compressed, it is expanded here and converted into an analog form. In step 124, an instruction is also given to the switch 26 to connect it to the direction shown in the drawing. Thus, the audio signal input in the digital form is given to the speaker 27 to reproduce the audio. Furthermore, an instruction is given to the OSD generator 29 in step 125, and a message may be indicated on the display 24 to show that the audio signal supplied from the interface 42 is being output. When there is a component between the interface 44 and the switch 26 in addition to the sub-audio evaluation circuit 210, power supply to them may be stopped. Then, the procedure returns to the step 102 of judging the superimposition of audio and judgment is continued.

Case where it is judged that the error rate is large in step 111 of FIG. 7 will be described. The procedure goes downward from the left side of step 111 to step 112, where it is judged whether the audio signal from the interface 44 is present or not. It is made by the sub-audio evaluation circuit 210 in FIG. 1. The audio signal is often given in an analog form, but it may be a digital audio signal which is given without being superimposed on the video signal as described above. When there is an audio signal, the procedure goes leftward from step 112, and the audio signal which is given from the interface 44 is given to the speaker 27 through the same route as described above. Especially, this procedure is employed when the error rate on the interface 42 side is poor and the audio signal from the interface 44 side has better quality. When there is no audio signal, the audio signal from the interface 42 is output regardless of its quality. The procedure goes downward from step 112 to step 113, where power is supplied to the audio processor 25 with the DAC, and the separated audio signal is expanded and converted into an analog form. In step 114, an instruction is also given to the switch 26 to connect to the direction shown in the drawing. Thus, the audio signal input in the digital form is given to the speaker 27 to reproduce the sound. Furthermore, in step 115, it may be configured in such a way that when an instruction is sent to the OSD generator 29 to output the audio signal supplied from the interface 42, but its quality is defective, then a message is shown on the display 24 to indicate that loosening of the cable is checked, or the cable is changed to a shorter one. When there is a component between the interface 44 and the switch 26 in addition to the sub-audio evaluation circuit 210, power supply to them may be stopped. Then, the procedure returns to the step 102 of judging the superimposition of audio and judgment is continued.

The judgment on the presence or not of audio in step 112 of FIG. 7 may be made by evaluating the quality of the audio signal input from the interface 44 by the sub-audio evaluation circuit 210 and checking that it is better in quality than the audio signal input from the interface 42. Otherwise, a prescribed lower limit is determined for the quality of the audio signal input from the interface 44, and if inferior to it, the audio signal input from the interface 42 may be output even if the error rate is high.

When it is judged in step 111 that the error rate is high, the aforementioned switching operation is not performed immediately, and switching may be made considering the duration of the state. If there is a moment when the error rate is degraded during a long time, it is rather annoying to switch every time the error rate is degraded. For example, it is desirable to change for the first time when the same state has continued for a few seconds.

By configuring as described above, the digital audio signal input in the state superimposed on the video signal and the audio signals having good quality among those separately input are automatically selected and output. If either of them is missing, the counterpart is automatically selected, but if its quality is defective, a warning can be indicated. It can be seen from the display which one was selected. There is also a method of showing several means to make the user to select. Furthermore, power saving can be made by turning off the power to a non-use circuit block. It is effective to be able to eliminate the inconvenience due to frequent switching because of an error increase in a short time.

An example application of the system to which the invention is applied will be described.

Figure 8:
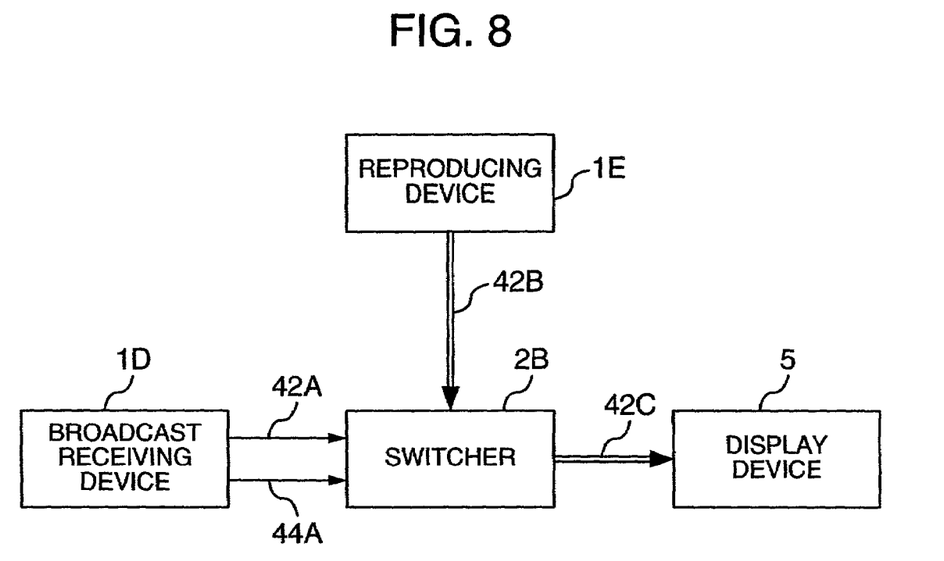
FIG. 8 is a block diagram of a system using a switcher as an embodiment of the image and audio receiver of the invention.

FIG. 8 is a block diagram showing an example of switching information having received broadcasting and information having reproduced package software by means of a switcher as an example of the video and audio receiving device of the invention. In FIG. 8, indicates a broadcast receiving device which corresponds to the STB; and 1E indicates a reproducing device, 2B a switcher, 5 a display device, 42A and 42B digital video signal line interfaces, and 44A an audio-dedicated interface.

The switcher 2B switches between video output of the broadcast receiving device 1D and video output of the reproducing device 1E of package software or the like. It operates as the video and audio receiving device of the invention and can select good audio information for any input. By superimposing the obtained audio information on the video information again, there is an advantage that the video and audio information can be transmitted by the connection of a digital video interface 42C only to the display device 5 which is connected to the output of the switcher 2B.

The present invention can be generally applied to a device which inputs and processes the video information. Not only the display device mainly described, but also the recording device for recording the video information, a distributing device for outputting to distribute the input information again fall in the range of applications, and it falls within the category of the invention.

The invention is not limited to the above case that the cable interfaces are used between the respective devices. In the future, home networking will advance including not only the devices related to information such as video but also general electrical appliances. In such a case, a radio interface will be used increasingly between a home server and respective personal terminals; and the invention can be applied to wireless delivery of video contents between the devices.

When a radio interface is used, a warning OSD indication will be, for example, "Radio conditions are not good, bring the antennas of the signal source and the display device nearer." or "Consider the use of a cable." instead of the indication of urging the replacement of the cable when the cable interface is used. To increase the sending power, a command may be sent to the sender to lower the error rate.

According to the present invention, there is an effect that ease of use is improved because measures are shown for the user as an appropriate warning indication depending on a state of the input video and audio signal, or an appropriate video and audio signal can be obtained automatically.

It should be further understood by those skilled in the art that the foregoing description has been made on embodiments of the invention and that various changes and modifications may be made in the invention without departing from the spirit of the invention and the scope of the appended claims.

What is claimed is:

1. A television receiver which receives a digital video signal on which a digital audio signal is superimposed and a second audio signal input separately, shows an image obtained from the digital video signal on a display device, and can output audio obtained from the digital audio signal or the second audio signal through a loudspeaker, wherein:
    a sub-audio evaluation circuit evaluates quality of the second audio signal,
    an audio switching control circuit outputs a control signal indicating whether an error rate of the digital video or audio signal exceeds a threshold value or not,
    separation means separate the digital audio signal from the digital video signal,
    a switch which is connected to the audio switching control circuit and selects either the digital audio signal or the second audio signal separated by the separation means based on the control signal output from the audio switching control circuit and supplies to the loudspeaker; and
    the audio switching control circuit controls the switch to select the digital audio signal separated by the separation means when an error rate of the digital video or audio signal is smaller than a threshold value, and to select the second audio signal when the error rate exceeds the threshold value, the second audio signal is input by the sub-audio evaluation circuit and sound quality is judged good.

2. The television receiver according to claim 1, wherein an OSD display circuit is disposed, and when the OSD display circuit is controlled by the audio switching control circuit with an error rate of the digital audio signal exceeding a threshold value and the digital audio signal is selected by the switch, the OSD display circuit shows a warning message about the sound quality of the digital audio signal on the display device.

3. The television receiver according to claim 1, wherein the switching control circuit controls the switch to select the analog audio signal when the state that the error rate exceeds the threshold value continues for a prescribed period.

4. The television receiver according to claim 1, wherein the switching control circuit stops supplying power to the sub-audio evaluation circuit when the error rate is smaller than the threshold value.

5. A video processing device receiving a video signal output from a signal generating device and performing a predetermined signal processing of the input video signal, comprising:
    a control circuit including a detecting section detecting information related to a quantity of noise contained in the input video signal;
    an OSD (On Screen Display) circuit causing message information to be displayed on a display section;
    a holding circuit holding plural pieces of signal format information containing at least one of number of scanning lines and horizontal resolution of the video signal; and
    an interface section communicating with the signal generating device,
    wherein the control circuit controls the OSD circuit to display the message information on the display section when the detected quantity of noise is larger than a predetermined value and selects the signal format information indicating number of scanning lines or horizontal resolution less than those of the received video signal from the plural pieces of signal format information held by the holding circuit, and
    wherein the selected signal format information is transmitted to the signal generating device through the interface section.

6. The video processing device according to claim 5, wherein the message information includes alternatives for allowing a user to determine whether the control circuit performs the selection of the signal format information and the transmission of the signal format information to the signal generating device.

7. The video processing device according to claim 5, wherein the message information includes a message for urging a user to change a connection line for transmitting a digital video signal.

8. The video processing device according to claim 5, wherein the control circuit detects an error rate of the video signal as the information related to the quantity of noise and does not perform the selecting operation of the signal format information when a state indicating that the error rate becomes equal to or greater than a predetermined value, elapses in an interval equal to or less than a certain period of time.

9. The video processing device according to claim 5, wherein the video processing device includes a display section for displaying at least digital video signal.

10. The video processing device according to claim 5, wherein the video processing device includes a recording section for recording at least digital video signal.

11. The video processing device according to claim 5, wherein the video processing device is a video signal distributing device for distributing at least digital video signal to other equipment.

12. The video processing device according to claim 5, further comprising:
    a first receiving circuit receiving a digital video signal;
    a second receiving circuit receiving an analog video signal; and a switch selecting and switching an output signal from one of the first receiving circuit and the second receiving circuit;

wherein the control circuit controls the switch to select the output signal from the second receiving circuit when the first receiving circuit is not receiving the digital video signal.

13. The video processing device according to claim 5, further comprising:

a first receiving circuit receiving a digital video signal;

a second receiving circuit receiving an analog video signal; and a switch selecting and switching an output signal from one of the first receiving circuit and the second receiving circuit;

wherein the control circuit controls the switch to select the output signal from the second receiving circuit when the first receiving circuit receives a signal indicating a still image having a single color or a single brightness.

14. The video processing device according to claim 5, wherein the control circuit selects the output signal from the first receiving circuit when the detected error rate is lower than the predetermined threshold value or when a state indicating that the detected error rate is higher than the predetermined threshold value does not continue for a certain period of time and controls the switch to select the output signal from the second receiving circuit when a state indicating that the detected error rate is higher than the predetermined threshold value continues for the certain period of time.

15. A video processing device, comprising:

a first receiving circuit receiving a digital video signal;

a second receiving circuit receiving an analog video signal; and a switch selecting and switching an output signal from one of the first receiving circuit and the second receiving circuit;

a control circuit including a detecting section detecting an error rate of at least one of the digital video signal received by the first receiving circuit and of a digital audio signal superimposed on the digital video signal, the control circuit selecting the output signal from the first receiving circuit when the detected error rate is lower than a predetermined threshold value and selecting the output signal from the second receiving circuit when the detected error rate is higher than the predetermined threshold value; and an OSD (On Screen Display) circuit causing message information to be displayed on a display section, the message information indicating that the selection has been attempted when the output signal from the second receiving circuit is selected by the control circuit.

* * * * *